(12) United States Patent
Espejo et al.

(10) Patent No.: US 7,529,538 B2
(45) Date of Patent: May 5, 2009

(54) PRE-PAID WIRELESS INTERACTIVE VOICE RESPONSE SYSTEM

(75) Inventors: Judith C. Espejo, Snellville, GA (US); Lance F. Casey, Suwanee, GA (US); Carmen D. Andia, Atlanta, GA (US); Judy D. Martin, Lawrenceville, GA (US); Adrian C. Rudd, Powder Springs, GA (US); Susan F. Meek, Norcross, GA (US); Brenda L. Boyden, Smyrna, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 0 days.

(21) Appl. No.: 11/811,474

(22) Filed: Jun. 11, 2007

(65) Prior Publication Data
US 2007/0243857 A1 Oct. 18, 2007

Related U.S. Application Data

(63) Continuation of application No. 11/472,773, filed on Jun. 22, 2006, now Pat. No. 7,231,201, which is a continuation of application No. 09/749,837, filed on Dec. 28, 2000, now Pat. No. 7,088,987.

(60) Provisional application No. 60/216,698, filed on Jul. 7, 2000.

(51) Int. Cl.
*H04Q 7/20* (2006.01)
(52) U.S. Cl. .................. 455/408; 455/405; 455/406
(58) Field of Classification Search .............. None
See application file for complete search history.

(56) References Cited

U.S. PATENT DOCUMENTS

| | | | |
|---|---|---|---|
| 5,353,335 A | 10/1994 | D'Urso et al. |
| 5,355,406 A | 10/1994 | Chencinski et al. |
| 5,511,114 A | 4/1996 | Stimson et al. |
| 5,995,822 A | 11/1999 | Smith et al. |
| 6,075,855 A | 6/2000 | Christiansen et al. |
| 6,157,823 A | 12/2000 | Fougnies et al. |
| 6,185,414 B1 | 2/2001 | Brunner et al. |
| 6,327,363 B1 | 12/2001 | Henderson et al. |
| 6,373,930 B1 | 4/2002 | McConnell et al. |
| 6,377,938 B1 | 4/2002 | Block et al. |
| 6,393,269 B1 | 5/2002 | Hartmaier et al. |
| 6,397,055 B1 | 5/2002 | McHenry et al. |
| 6,404,880 B1 | 6/2002 | Stevens |
| 6,411,803 B1 | 6/2002 | Malacowski et al. |

(Continued)

OTHER PUBLICATIONS

"Please Deposit No Cents", S. Moshavi, Aug. 16, 1993, Forbes, p. 102.

(Continued)

*Primary Examiner*—Erika A Gary
(74) *Attorney, Agent, or Firm*—Cantor Colburn LLP

(57) ABSTRACT

A wireless communications system providing interactive voice response is disclosed. The system is menu-driven, and can accept information and requests from customers. In response to one type of request, the system can provide the customer with information regarding their current rate plan and features. In system also includes provisions that provide customers with details of the rate plan, including fee number of minutes, and rate information for calls placed at various times and various days.

20 Claims, 8 Drawing Sheets

U.S. PATENT DOCUMENTS

| | | |
|---|---|---|
| 6,424,706 B1 | 7/2002 | Katz et al. |
| 6,480,710 B1 | 11/2002 | Laybourn et al. |
| 6,490,450 B1 | 12/2002 | Batni et al. |
| 6,496,690 B1 | 12/2002 | Cobo et al. |
| 6,496,691 B1 | 12/2002 | Easley et al. |
| 6,507,644 B1 | 1/2003 | Henderson et al. |
| 6,526,273 B1 | 2/2003 | Link et al. |
| 6,542,601 B1 | 4/2003 | Hernandez et al. |
| 6,625,439 B2 | 9/2003 | Laybourn et al. |
| 6,728,353 B1 | 4/2004 | Espejo et al. |
| 6,748,066 B1 | 6/2004 | Espejo et al. |
| 7,088,987 B1 | 8/2006 | Espejo et al. |
| 7,184,748 B2 * | 2/2007 | Espejo et al. ............... 455/406 |
| 7,231,201 B2 * | 6/2007 | Espejo et al. ............... 455/408 |
| 2001/0001321 A1 | 5/2001 | Resnick et al. |
| 2002/0029189 A1 | 3/2002 | Titus et al. |
| 2002/0104090 A1 | 8/2002 | Stettner |
| 2003/0143978 A1 | 7/2003 | Cooper et al. |
| 2004/0228457 A1 | 11/2004 | Espejo et al. |

OTHER PUBLICATIONS

"Sophisticated High Speed Capacity Voice Response Applications For End Users", William H. Cloward, Speech Tech '86, pp. 58-61 "The Official Proceedings of Speech Tech '86" Media Dimensions, Inc. Apr. 30, 1986.

* cited by examiner

PRE-PAID WIRELESS INTERACTIVE VOICE RESPONSE SYSTEM

CROSS-REFERENCE TO RELATED APPLICATIONS

This application is a continuation of U.S. patent application Ser No. 11/472,773 filed Jun. 22, 2006, now U.S. Pat. No. 7,231,201, the contents of which are incorporated by reference herein in their entirety, which is a continuation of U.S. patent application Ser. No. 09/749,837 filed Dec. 28, 2000, now U.S. Pat. No. 7,088,987, the contents of which are incorporated by reference herein in their entirety, which claims priority to U.S. Provisional Patent application 60/216,698 filed Jul. 7, 2000, the contents of which are incorporated by reference herein in their entirety.

BACKGROUND

1. Field of the Invention

The present invention is directed to a wireless interactive voice response system, and more particularly, to an interactive voice response system for pre-paid wireless customers.

2. Background of the Invention

Current pre-paid wireless communications systems require more voice channels to provide voice, data, and IVR ("Interactive Voice Response") services than post-paid wireless services. The requirement of additional voice channels is needed to ensure that all prepaid calls are properly managed by a prepaid system for real-time debiting. These additional resources are inefficient and costly for wireless carriers. Wireless standard organizations throughout the world, such as TIA/EIA-41 and European Telecommunications Standards Institute (ETSI), have recognized this problem recently and have recently proposed the use of Common Channel Signaling System 7 (CCS7) Intelligent Network (IN) services. The following example shows a typical prior art pre-paid wireless system without Intelligent Network functionality.

FIG. 1 is a schematic drawing of a prior art system 100 for providing IVR services for pre-paid customers. When a call is placed from a wireless device 106 (for example, a wireless telephone), the call is routed to mobile switching system 102 (which contains a Home Location Register (HLR), Visiting Location Register (VLR) and switch) through a first voice path or voice channel 107. The call is then routed through a second voice path 108 to a peripheral device 104. The peripheral device 104 communicates with a database 110 and retrieves information regarding the calling party's account. One of the items peripheral device 104 retrieves is information regarding the amount of funds the calling party has available in the account. It is important to monitor pre-paid customer accounts on a per-call basis to prevent pre-paid customers from exceeding their account balances.

Once peripheral device 104 has retrieved the calling party's account information, peripheral device 104 determines if the calling party has sufficient funds in the account to complete the call. If the peripheral device 104 determines that the calling party has sufficient funds, then peripheral device 104 returns the call back to mobile switch 102 via a third voice path 112. Mobile switching system 102, upon receiving the call from peripheral device 104, then completes the call via a fourth voice path 114.

Alternatively, if peripheral device 104 includes a switch fabric, then peripheral device 104 can complete the call via a fifth voice path 116. In this case, peripheral device 104 would not need to route the call back to mobile switching system 102 via the third voice path 112, nor would the fourth voice path 114 be needed.

Peripheral device 104 must remain active for the duration of the call. Peripheral device 104 decrements the customer's account in real time during the call, and if the customer exhausts all of the funds available in the account, peripheral device 104 terminates the call. Peripheral device 104 is capable of terminating the call because the voice path is routed through it.

The process for handling incoming calls is similar. Mobile switching system 102 routes the incoming call to peripheral device 104 via a second voice path 108. Peripheral device 104 communicates with database 110 to determine account information and to manage the call. Peripheral device 104 then returns the call to mobile switching system 102 via a third voice path 112. Mobile switching system 102 then completes the call to the mobile device 106 via a first voice path 107.

In addition to participating in every outgoing and incoming call, the peripheral device 104 also provides IVR ("Interactive Voice Response") services. The user of mobile device 106 dials a predetermined number, the "customer service number" or a unique number dedicated to accessing the prepaid IVR, to obtain customer service or prepaid IVR menu access. When the customer service number or unique number is dialed, mobile switching system 102 routes the call to peripheral device 104. This peripheral device can be the same device that manages and accounts for calls, or it can be a different peripheral device.

Because peripheral device 104 must both receive instructions from a user and also communicate with the user, two voice paths 108 and 112, one to and one from the peripheral device 104, are required for prepaid IVR services. After peripheral device 104 has been contacted by mobile switching system 102, peripheral device 104 determines that the call is a customer service or prepaid IVR call based on the dialed telephone number. After peripheral device 104 has determined that the customer service number or unique number has been dialed, peripheral device 104 provides customer service by the use of prepaid IVR.

Traditional IVR systems are generally menu-driven, and users indicate their selections by pressing numbers on their numeric keypads. With traditional prepaid IVR systems, users could perform basic functions, such as checking their current account balances.

One of the major drawbacks of conventional pre-paid wireless systems is the number of voice paths, or channels, required to complete a call. In the examples above, either three or four voice paths were required to complete one telephone call. In addition, at least one or two voice paths were required between a mobile switching system and a peripheral device. This conventional arrangement consumes excessive system resources. Additionally, the prior art peripheral devices, such as peripheral device 104 mentioned in the examples above, are expensive and proprietary. They are often custom-built devices that are made for a single application. Thus, they are expensive to purchase or lease, and maintenance is also expensive. Accordingly, the use of a custom-built proprietary device and the use of multiple-voice paths is not cost effective and consumes excessive system resources.

Another drawback of conventional pre-paid IVR systems is the lack of useful features and the lack of flexibility of the IVR. Conventional pre-paid wireless IVR systems include only basic and rudimentary functions. Because of this, they often fail to fulfill the service needs of customers. When this occurs, customers request the help of a live CSR ("Customer Service Representative"). Live CSR's are very costly, and any system that can reduce the number of customers who request the assistance of a live CSR (because they are unsatisfied with the assistance they receive from the IVR), greatly increases cost savings to the wireless communications service provider.

Pre-paid wireless customers are a particular group of customers that frequently request customer assistance. This is due to their accounting arrangement. In contrast to post-paid customers, who receive periodic bills after they have used wireless communications services, pre-paid wireless customers first provide funds to a pre-paid wireless account. As they use wireless communications services, funds are deducted from their pre-paid account. It is often difficult for pre-paid wireless customers to remember the frequency and duration of each call they place, and even more difficult for them to calculate or estimate the amount of funds deducted for each call. In addition to these difficult tasks, pre-paid wireless customers do not always keep a running total of funds deducted from their pre-paid accounts.

Most pre-paid wireless customers do not record or remember such detailed information about their pre-paid accounts, so they frequently resort to calling customer service simply to check the remaining balance on their pre-paid accounts. Another need, the need to add funds to the accounts, also generates frequent calls to customer service. This results in very frequent calls in to customer service by pre-paid wireless customers. Because pre-paid wireless customers tend to be the least profitable customers, traditional pre-paid wireless communications service providers are left in a situation where their least profitable customers are the customers who are the most costly to support. This higher need for customer service to support prepaid wireless customers forces wireless carriers to purchase or design IVR's that support these needs.

SUMMARY AND OBJECTS OF THE INVENTION

Figure 1:
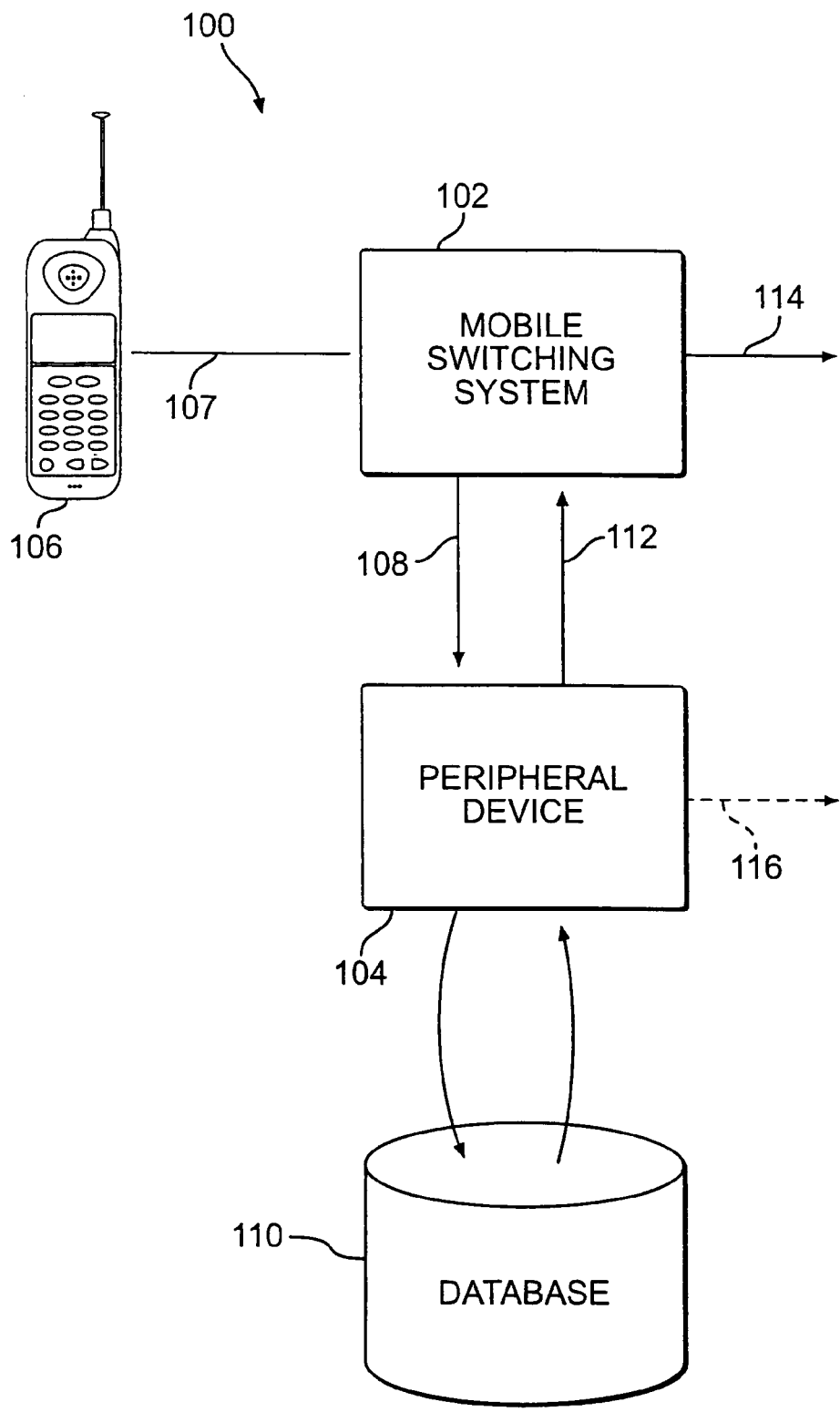
FIG. 1 is a schematic drawing of a prior art system for providing IVR services for pre-paid customers.

The present invention can be implemented by the use of a wireless communication system that provides interactive voice response including a mobile switching system adapted to communicate with at least one wireless device, for example, a wireless telephone capable of establishing a control channel and a voice channel with the wireless device. The system also includes an Intelligent Network device called a Service Control Point ("SCP") in communication with the mobile switch that is capable of retrieving customer information. The SCP includes an IVR application. The system also includes an Intelligent Network device called an Intelligent Peripheral ("IP") where the IVR announcement recordings or other specialized user interaction resources reside, are under the control of the SCP, and in communication with the mobile switching system. The Intelligent Peripheral is adapted to play voice-recorded messages through a voice channel to the mobile switch, and ultimately to the wireless device. Preferably, the mobile switch communicates with the SCP using CCS7 Intelligent Network signaling. This is also called Transactional Capabilities Application Part ("TCAP") messaging and the SCP communicates with the IP using either TCAP messaging or communications using TCP/IP protocols.

In another aspect, the invention includes a wireless communications system that can route a calling party immediately to the IVR when the system receives a predetermined dialed number. The dialed number can be an abbreviated number.

In another aspect, the invention includes an interactive voice response system for pre-paid wireless services that has a peripheral device in communication with a mobile switching system, the mobile switching system is capable of communicating with at least one wireless device. An IVR application on the peripheral device includes a menu driven system adapted to receive information from a customer. When the IVR application receives certain information from the customer, the menu driven system responds to by reciting at least one previous transaction.

In another aspect, the invention includes an interactive voice response system for pre-paid wireless services including a peripheral device in communication with a mobile switching system, and the mobile switch being capable of communicating with at least one wireless device. An IVR application on the peripheral device includes a menu driven system adapted to receive information from a customer. When the menu driven system receives certain information from the customer, it responds by reciting at least one location at which pre-paid calling cards can be purchased. The customer can provide zip code, or other location information.

In another aspect, the invention includes an interactive voice response system for pre-paid wireless services including a peripheral device in communication with a mobile switch, and the mobile switch being capable of communicating with at least one wireless device. An IVR application on the peripheral device including a menu driven system adapted to receive information from a customer. The menu driven system responds to the information received from the customer by reciting the current rate plan of the customer.

In another aspect, the invention includes an interactive voice response system for pre-paid wireless services including a peripheral device in communication with a mobile switch, and the mobile switch being capable of communicating with at least one wireless device. An IVR application on the peripheral device including a menu driven system adapted to receive information from a customer. The menu driven system includes provisions that permit users to change the type, frequency, content, and occurrence of prompt information without the assistance of a customer service representative.

Accordingly, the present invention is directed to a wireless communication system that provides interactive voice response that substantially obviates one or more of the problems due to limitations and disadvantages of the related art.

An object of the present invention is to conserve system resources.

Another object of the present invention is to provide a system for providing IVR where standard components and devices are used, and the use of custom-built products is reduced or eliminated.

Another object of the present invention is to reduce the cost of purchasing and maintaining an IVR system.

Another object of the present invention is to provide a system that minimizes the number of voice channels or voice paths necessary to complete a pre-paid wireless telephone call.

Another object of the present invention is to reduce the number of customer service calls that request the assistance of a live CSR.

Another object of the present invention is to provide an IVR system that is flexible and can be tailored by each customer.

Another object of the present invention is to provide an IVR system that allows customers to review detailed account information.

Another object of the present invention is to provide an IVR system that allows customers to retrieve details of their transactions.

Another object of the present invention is to provide an IVR system that allows customers to modify and change the type, frequency, content, and occurrence of prompt information without the assistance of a customer service representative.

Another object of the present invention is to provide an IVR system that allows customers to retrieve information regarding locations where they can go to replenish their accounts.

Additional features and advantages of the invention will be set forth in the description which follows, and in part will be apparent from the description, or may be learned by practice of the invention. The objectives and advantages of the invention will be realized and attained by the structure and steps particularly pointed out in the written description, the claims and the drawings.

DETAILED DESCRIPTION OF A PREFERRED EMBODIMENT(S)

Figure 2:
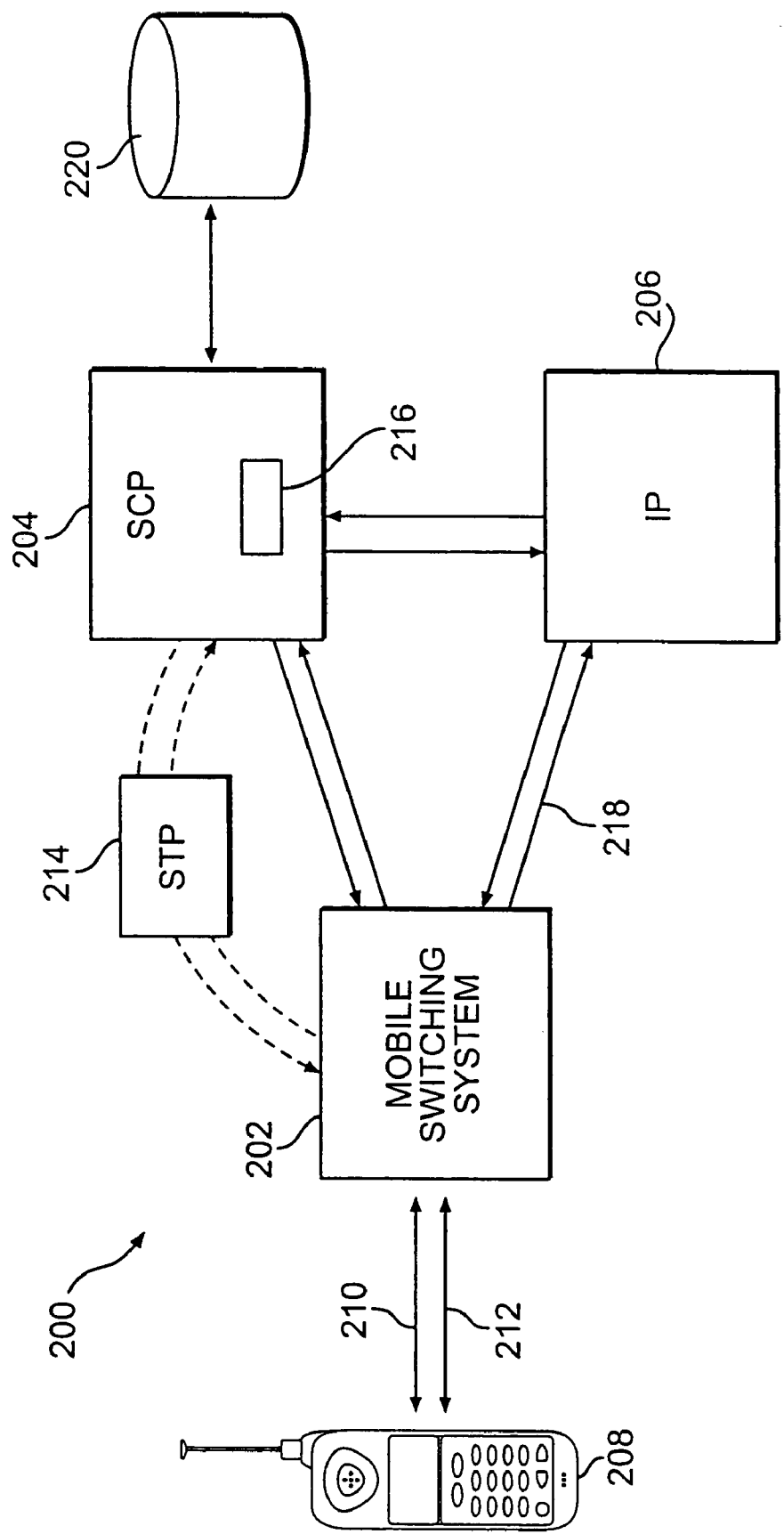
FIG. 2 is a schematic drawing of a preferred embodiment of the present invention.

FIG. 2 is a schematic drawing of a preferred embodiment of the present invention. System 200 is an Intelligent Network comprising a mobile switching system 202, an SCP ("Service Control Point") 204, and an Intelligent Peripheral ("IP") 206, and in Signaling Transfer Point (STP) 214. In some cases, an Intelligent Network device, called a Service Node (SN), combines the functions of an SCP and an IP. For systems using an SN, a single SN would replace the SCP and the IP. One way to understand the principles of the present invention is to consider an example of a customer using the interactive voice response system in accordance with the present invention.

A wireless device, for example a mobile phone, 208 places a call. Assuming the customer owning the wireless device has interactive voice response capabilities, the following occurs when the customer places a call. Generally, the entire time the wireless device 208 s within the range of mobile switching system 202, a control channel 210 is established between mobile switch 202 and wireless device 208. In addition to the existing control channel 210, when the call is originated, a voice channel 212 is established between the wireless device 208 and the mobile switching system 202.

When the call is originated, mobile switching system 202 receives the telephone number of the wireless device, and the dialed digits. Usually, the dialed digits are the telephone number of the called party, but the dialed digits can also be a code. Mobile switching system 202 determines if the calling party has Intelligent Network (IN) services. If mobile switching system 202 determines that the calling party has IN services, then mobile switching system 202 initiates communications with SCP 204 for instructions on how to proceed with the call.

Within the initial communication from the Mobile switching system 202 to the SCP 204, the mobile switching system 202 sends the dialed digits, the telephone number or code entered into wireless device 208, and the telephone number, or originating number, of wireless device 208 to SCP 204 using IN TCAP messages. In an exemplary embodiment, IN TCAP messaging according to the wireless standards body known as EIA/TIA-41 Interim Standard (IS) 826, also known as Wireless Intelligent Network (WIN) Phase 2, Pre-Paid, is used as the IN TCAP protocol. An STP 214, and SS7 router, helps to properly route the call from mobile switching system 202 to SCP 204. IN TCAP messaging is used as the communications protocol between mobile switching system 202 and SCP 204. There are different types of TCAP protocols within wireless networks. Global Systems for Mobile Communications (GSM) wireless systems use TCAP messaging format defined by the European Telecommunications Standards Institutes (ETSI) standard organization. AMPs, TDMA, and CDMA wireless systems use TCAP messaging format defined by EIA/TIA-41 standards organization.

An IVR application 216 resides on SCP 204. This application 216 includes instructions and software for handling IVR services. There are many situations in which IVR services are used. In some instances, customers who want customer service dial a specific number to obtain IVR services. Some subscribers are given voice prompts or messages each time they use their wireless device 208, and some subscribers are occasionally given IVR services, voice prompts or messages (but not every time they use their wireless device 208). SCP 204, given the called party's telephone number and other criteria, can determine whether to provide IVR services to this customer during this call.

If SCP 204 determines that IVR services are required during the call, SCP 204 communicates with mobile switching system 202 to establish a connection with IP 206. SCP 204 preferably uses IN TCAP messaging to communicate with mobile switching system 202. Mobile switching system 202 will then establish a connection with IP 206, preferably, by the use of a voice trunk. Thus, a voice channel 218 now exists between mobile switching system 202 and IP 206. After voice channel 218 has been established between mobile switching system 202 and IP 206, IP 206 communicates with the SCP 204 and informs SCP 204 that a voice channel 218 has been established and waits for the next instruction. The communications between IP 206 and SCP 204 are conducted using IN TCAP messaging or are conducted using TCP/IP Protocol.

In this embodiment of the invention, the provisions that provide the voice prompts and voice message recordings of IVR services reside on IP 206. In this embodiment, IP 206 is the device that actually speaks to the customer. After IP 206 queries SCP 204, SCP 204 returns information to IP 206 and permits IP 206 to send the appropriate voice messages to wireless device 208 via mobile switching system 202.

Figure 3:
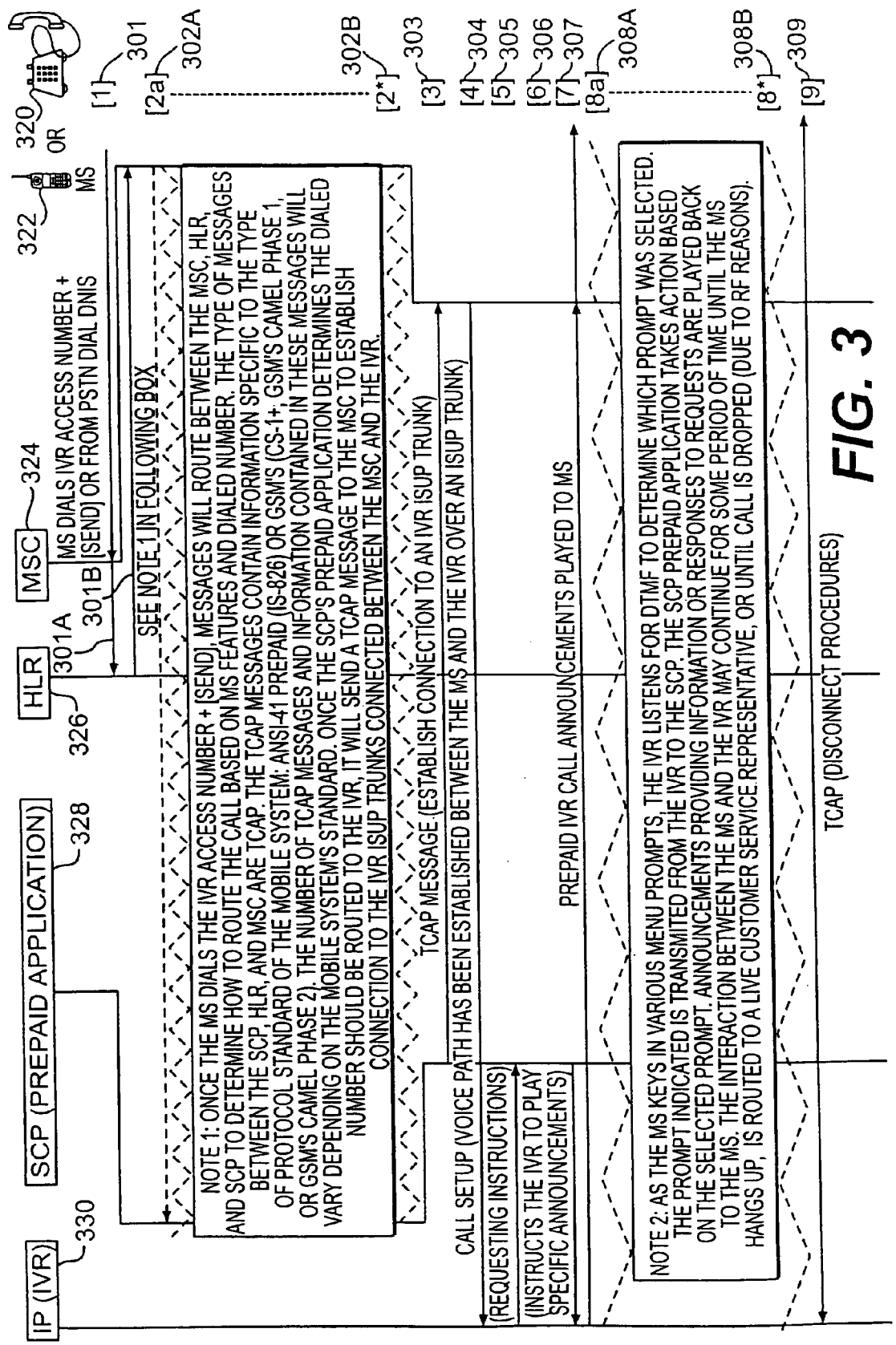
FIG. 3 is a schematic diagram showing the transactions performed in an embodiment of the present invention.

FIG. 3 shows an embodiment of the present invention expressed in a transactional diagram. These diagrams are sometimes referred to as "Ping-Pong" diagrams.

Starting in the upper right hand corner, a wireless device, such as a wireless telephone 322 or a landline telephone 320 places a call to an appropriate telephone number. In first step 301, the call is routed to mobile switch 324. The wireless device 322 preferably dials abbreviated dialing digits and the landline telephone preferably dials a toll free number. Once mobile switch 324 receives the call, the mobile switch 324 communicates to the Home Location Register (HLR) 326 in step 301A using IN TCAP messaging. HLR 326 determines if the call requires the use of any IN services. Preferably, HLR 326 determines whether IN services are required for the call by using the dialed digits from landline 320 or the originating number of mobile device 322. In step 301B, HLR returns the call to mobile switch 324, preferably using IN TCAP messaging, with instructions on how to route the call. If the call does not require IN services, then mobile switch 324 routes the call in a known manner. If the call requires IN services, as is the case in this example, then mobile switch 324 requests instructions on how to the route the call from SCP 328 in step 302A. Preferably, communications between mobile switch 324 and SCP 328 are conducted in either TCP/IP or IN TCAP messaging.

An application for prepaid customers preferably resides on SCP 328. Once the SCP's prepaid application determines that the dialed number should be routed to an IVR system, SCP 328 will send a TCAP message to mobile switch 324. This message from SCP 328 to mobile switch 324 is shown as step 303. This message informs mobile switch 324 to establish a voice connection between itself and an IP 330. In step 304, a voice path is established between IP 330 and mobile switch 324 using an Integrated Services Digital Network User Part (ISUP) type voice trunk.

In steps 305 and 306, IP 330 communicates with SCP 328. IP 330 requests instructions from SCP 328 and SCP 328 responds to those questions by commanding IP 330 to play various messages. In step 307, IP 330 plays an initial announcement or message to the customer over the established voice path. In the step 308, the calling party and IP 330 interact as the calling party transmits commands to IP 330. IP 330 responds to those commands and provides the calling party with requested information. The interaction between the calling party and IP 330 continues for some time until the calling party hangs up or the call is interrupted. After the call has ended, in step 309 the system performs TCAP disconnect procedures.

The IVR Session

The present invention includes unique IVR features. But, before customers can access these features, they must first navigate through a system of security by providing proof of their identity to the system in order to gain access to IVR customer support.

Figure 4:
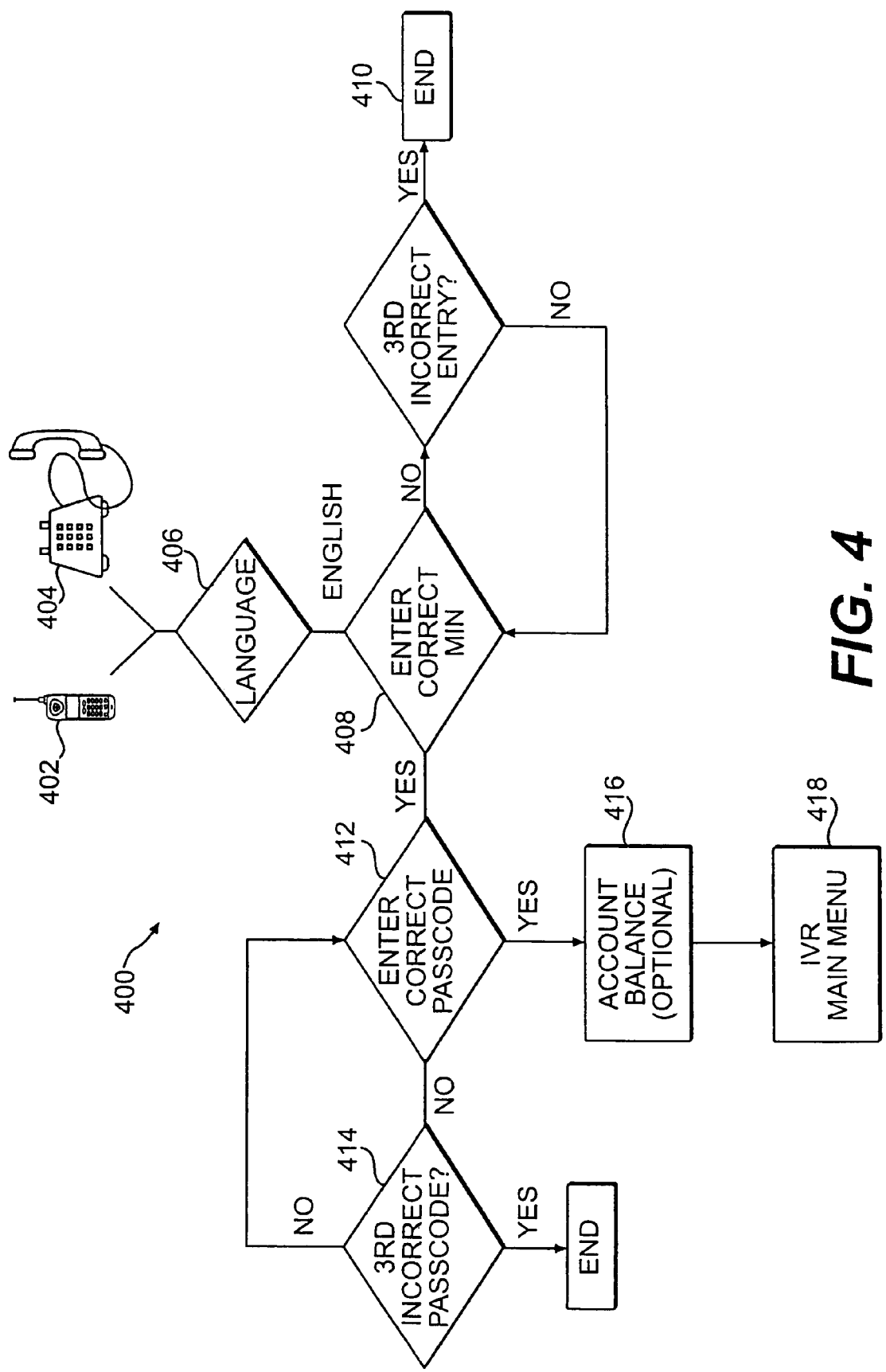
FIG. 4 is a schematic diagram showing a preferred embodiment of a security system.

FIG. 4 is a schematic showing a preferred embodiment of a security system. Wireless device 402 can gain access to IVR customer support by dialing a predetermined number. In a preferred embodiment, the predetermined number is an abbreviated number containing less than 10 digits. In another preferred embodiment, the predetermined number is a three-digit number. In an exemplary embodiment, the predetermined number is x11, for example, 511, 611, or 711.

A customer can also gain access to IVR customer support through a landline phone 404. Preferably, a customer gains access to IVR customer support through a landline phone 404 by dialing a different, second predetermined number. Preferably, this second predetermined number is a 1-800 number, for example, 1-800-XXX-XXXX, where the X can represent different numbers.

Once a customer dials either one of those predetermined numbers, the call is routed to the IVR customer support system 400. The first step 406 of the system is to permit customers to select the appropriate language for the IVR customer support session. This step is optional and some embodiments of the present invention omit this step. The system 400 can provide any number of different language selections, depending on the demographics of the customers who might use system 400. Once the language selection is made, system 400 conducts the IVR session in the selected language.

Of course, the system can conduct the IVR session in any language, but for clarity, the remainder of this description assumes the session is conducted in English, keeping in mind that other languages could also be used. The flow chart of FIG. 4 applies, no matter which language is selected in step 406. After a language is selected in the first step 406, the system 400 then asks for the correct MIN (mobile identification number) in step 408. System 400 can either determine if a wireless device 402 or a landline phone 404 is calling system 400 by reviewing the calling party's telephone number. If system 400 determines that a wireless device 402 is calling, then system 400 can assume that the MIN is the calling party's telephone number. For landline calls, system 400 requests the entry of an appropriate MIN.

If a customer fails to enter the correct MIN on the third try, system 400 makes the decision to terminate the customer's IVR session in step 410. At this point, system 400 can either transfer the call to a CSR (customer service representative) or inform the customer of the problem and end the call.

Returning to step 408, and assuming the correct MIN has been received by system 400, the customer is then asked to enter the correct pass code in step 412. If an incorrect pass code is entered for the third time 414, then system 400 terminates the call. Assuming the correct pass code has been received, system 400 then sends the customer to the IVR main menu 418. Before the customer is sent to IVR main menu 418, an optional message 416 containing the customer's current account balance can be played.

Figure 5:
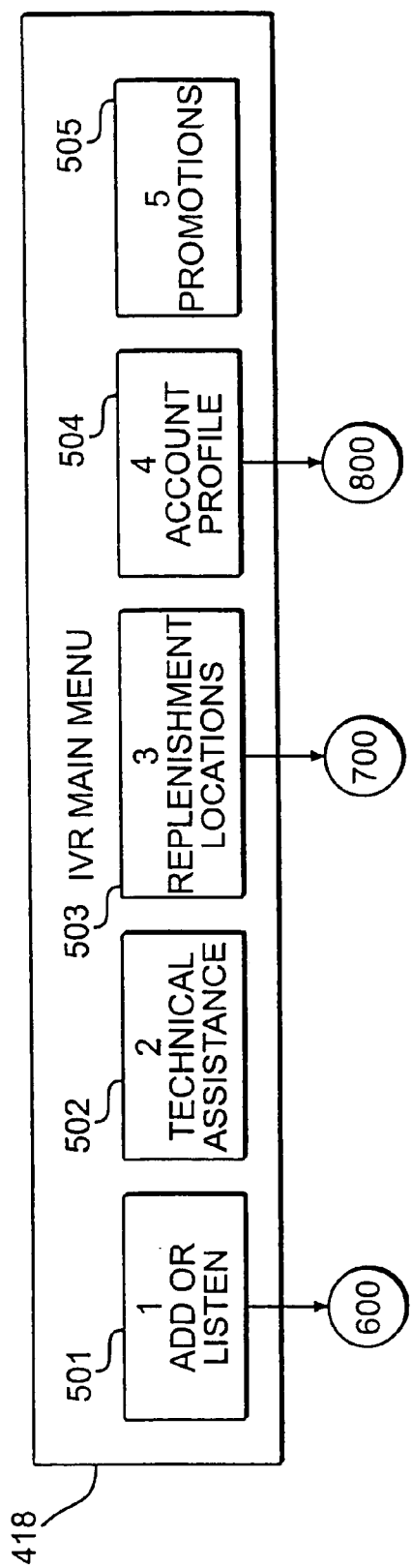
FIG. 5 is a schematic diagram of a main menu for an IVR in a preferred embodiment of the present invention.

As shown in FIG. 5, IVR main menu 418 contains several options. In the example shown in FIG. 5, customers can choose any one of the following options: (1) add to an account or listen to account information 501, (2) technical assistance and roaming information 502, (3) replenishment locations or sales 503, (4) account profile 504, (5) promotions 505. Customers enter their selection by pressing the number corresponding to their choice on their numeric keypad.

A numbering convention is used throughout this disclosure. An example of a possible number that could be used to designate a particular choice is shown in the item. For example, the numbers shown in items 501-505 are examples of numbers that can be assigned to those options. In this example, the customer would press the number 4 on their numeric keypad to receive information regarding their account profile. Additionally, there are three options available to the customer at all times. The customer can, at any time, press "0" to speak with a CSR, the customer can press "9" to have the current menu options replayed, or the customer can press "*" to return to the main menu.

(1) Add to Account or Listen to Account Information 501

Figure 6:
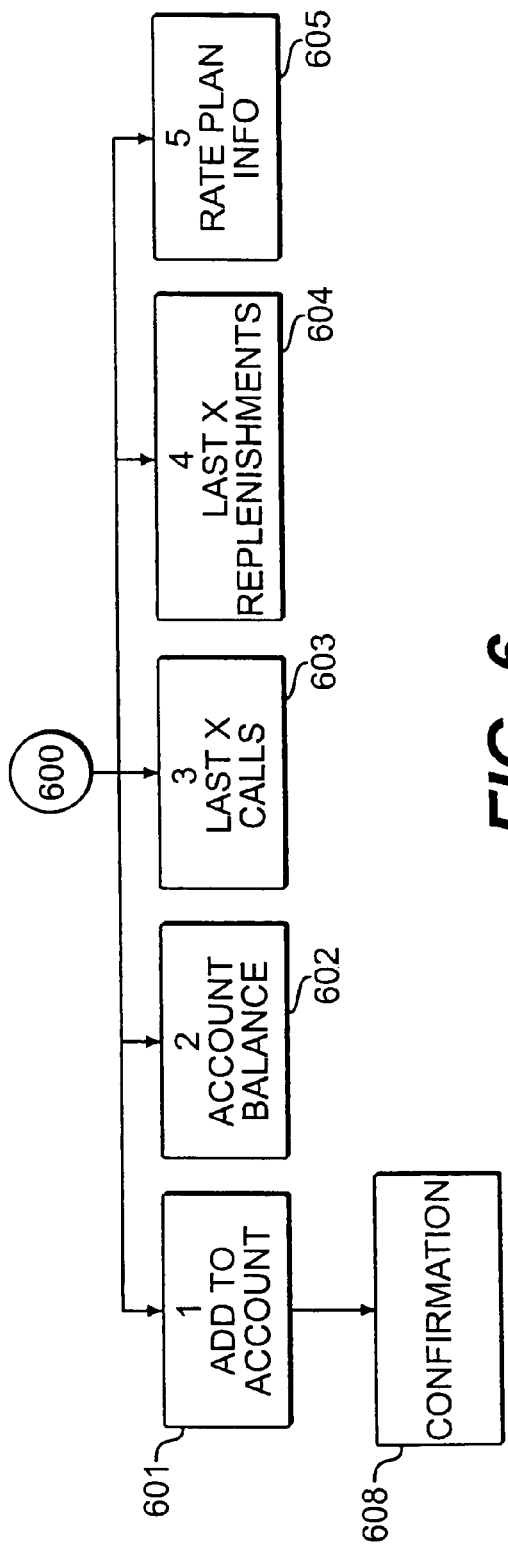
FIG. 6 is a schematic diagram of a submenu for an IVR in a preferred embodiment of the present invention.

If the customer chooses the first option, namely, to add to the account or listen to account information by pressing "1", the customer is presented with an array of options in this category, as shown in FIG. 6. The options are (1) add to account using a pre-paid card 601, (2) account balance 602, (3) last five calls 603, (4) last five replenishments 604, (5) rate plan information 605.

By selecting "1" in menu 501, customers can add to their accounts. Preferably, this option allows additions to accounts by the use of certain types of transactions. Preferably, those transactions include the use of pre-paid calling cards that include PIN's. Unlike the PIN's (Personal Identification Numbers) used in the banking industry in connection with automated teller machines that confirm the identity of a customer as the legitimate owner of a card, PIN's in the context of prepaid wireless communications services refer instead to numbers on pre-paid calling cards. These calling cards can be purchased in various denominations.

At step 601, system 400 requests the entry of a PIN. When customers enter the PIN number, system 400 can determine the value added to the customer's account, based on the PIN. System 400 can also determine if an invalid or fraudulent pin number has been entered. If an invalid number has been entered, system 400 will refuse to add value to the customer's account and may notify the customer of the error. System 400 may also provide additional opportunities to the customer to enter a valid pin number.

Assuming a valid pin number has been entered by the customer, system 400 then adds the value to the customer's account. After the customer has added funds to the pre-paid wireless account, system 400 preferably confirms the dollar amount of the transfer and can also preferably indicate the new account balance in step 608.

Customers can also check their account balances by selecting "2". System 400 responds to this selection by telling the customer the current account balance. System 400 can also tell customers the expiration date for their accounts. Some wireless telephone service providers limit the duration of accounts. This can be accomplished by setting an expiration date with pre-paid cards. The expiration dates can vary with the amount of the calling card. For example, a $10.00 card may have an expiration date 30 days after first use, a $20.00 card may last 45 days, a $30.00 card may last 60 days and so on. As new pre-paid cards are added to the account, the expiration date of the account is reset. By selecting "2", customers can listen to the current expiration date for their account.

By selecting "3", customers can retrieve information regarding their last several calls. Either a predetermined number of calls, for example 5, or a selected number of calls can be retrieved. The system can ask the customer for the number of previous calls, once that number has been received by the system, the system plays back information regarding those calls. Once the number of calls has been determined, system 400 gives the customer information related to those calls. In a preferred embodiment, system 400 tells the customer the date and time of the call, whether the call was an incoming or outgoing call, the duration of the call, the cost of the call, and the other party's telephone number. For example, system 400 could recite the following to the customer, "January $2^{nd}$ incoming call at 8:42 AM for 12 minutes from 707-555-1122." System 400 could continue to recite the other recent calls in a similar manner. System 400 can recite all of the selected sites, or system 400 can wait after an item has been recited for the customer to respond, preferably by pressing a button, before proceeding to the next item.

Selection 4 from this menu permits customers to review the last several replenishment transactions. Either a predetermined number of calls, for example 5, or a selected number of calls can be retrieved. The system can ask the customer for the number of previous calls, once that number has been received by the system, the system plays back information regarding those calls. Once the number of calls has been determined, system 400 gives the customer information related to those calls. Once the number of previous replenishment transactions has been determined, system 400 gives the customer information related to those transactions. In a preferred embodiment, system 400 tells the customer the date and time of the transaction, along with the amount. For example, system 400 could recite the following to the customer, "On December $23^{rd}$, at 8:50 PM, fifty dollars were added to your account." System 400 would continue to recite the other recent transactions in a similar manner. System 400 can recite all of the selected items, or system 400 can wait after an item has been recited for the customer to respond, preferably by pressing a button, before proceeding to the next item.

Customers can retrieve information regarding their current rate plan by selecting "5". System 400 can be programmed so that any information related to the plan can be disclosed to the customer. Preferably, system 400 tells the customer the name of the rate plan, the features and services that are included in the rate plan, and the amount of any fees, for example, daily access fees, or other charges associated with the rate plan.

(2) Technical Assistance and Roaming Information 502

In choosing the second option, the customer requests technical assistance or information related to roaming. After the system has received this selection, the system preferably refers the customer to a technical service representative. This representative assists the customer with any technical problems and can provide customers with roaming information.

(3) Replenishment Locations or Sales

There are several ways to add funds to a pre-paid wireless account. Customers can go to a store or kiosk that sells and services wireless phones. From there, customers can deal directly with a customer service representative, make payment, and have the CSR contact the pre-paid wireless service provider to inform the provider that additional funds have been placed in the customer's account.

Another option available to customers is the use of pre-paid cards, mentioned above. These cards are widely available at a variety of different locations, such as convenience stores (7-Eleven for example), electronics stores (Circuit City or Best Buy, for example), discount stores, grocery stores and other retail outlets.

These pre-paid cards are available in various denominations, for example, $5.00, $10.00, $20.00, $50.00, etc. These cards contain the PIN numbers discussed above, and are used to replenish pre-paid wireless accounts by the value of the card. Of course, the value of the card in wireless service could vary from the purchase price of the card. Cards can be worth more in wireless service than their purchase price in order to give customers volume discounts for purchasing higher denomination cards. After the cards have been purchased, customers can use the IVR system to add the value of the card to their pre-paid accounts, as discussed above.

Figure 7:
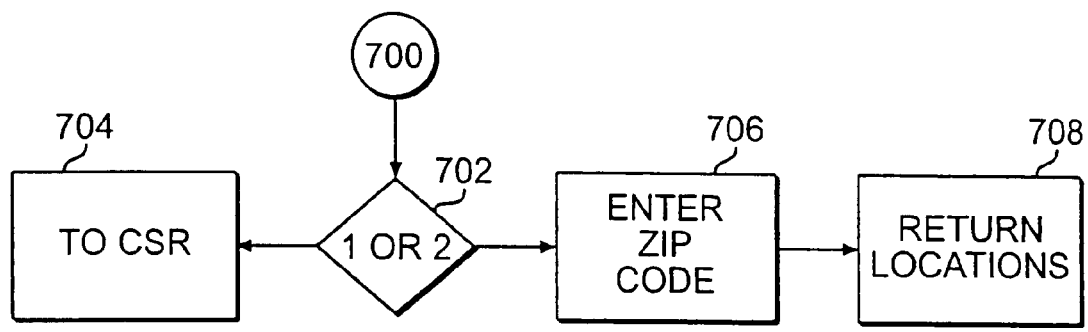
FIG. 7 is a schematic diagram of a submenu for an IVT in a preferred embodiment of the present invention.

Referring to FIGS. 5-7, system 400 includes provisions to assist customers in finding the nearest location of a store or venue where these special cards are available for purchase. Option 3 (item 503 in FIG. 5) in main menu 418 corresponds to the selection, "Replenishment Locations." When a customer selects this option, system 400 enters the menu for this option in step 700 and offers a choice in step 702. The customer can choose to speak with a CSR (1), or enter a zip code (2). If the customer chooses option (1), then the customer's call is routed to a CSR in step 704. If the customer chooses to enter a zip code, system 400 requests entry of a zip code and receives the current zip code of the customer in step 706. After the zip code has been entered, system 400 retrieves selected location information in step 708.

This location information can be stored in the same device or peripheral where the IVR application resides, or the location information can be stored on a database that is separate from the device or peripheral that houses the IVR application.

Preferably, the location information can is stored in a database. Preferably, the location information is stored according to zip code for fast retrieval.

There are many different ways the IVR system 400 can recite the locations to the customer in step 708. all, some, or one of the locations associated with a given zip code could be recited to the customer. The number of locations recited can be varied depending on the preferences of the customer and/or the discretion of the IVR service provider. Preferably, five locations are recited to the customer.

There are also many different ways the list of selected locations can be ordered when recited to the customer. In other words, system 400 can determine which location is recited first, second, third, and so on, to the customer. In addition, the list of retrieved locations can be randomized, and the first several locations can be recited to the customer. In an exemplary embodiment of the present invention, all of the locations for a particular zip code are placed in random order. This randomizing can occur once, at pre-selected time intervals, for example, every 10 minutes, every hour, every day, or every time a customer requests a list of locations. After the list has been randomized, the first five locations are recited to the customer.

If the list of recited locations is less than all of the locations for a particular zip code, then the customer can opt to listen to additional locations. In the exemplary embodiment, after the customer has listened to the first five locations, the customer can opt to listen to the next five locations, and so on.

Preferably, when the locations are recited, the name of the store or venue is recited, along with the street address. Relevant landmarks, adjacent major roads, and/or directions can also be recited along with the name and the street address.

(4) Account Profile

If the customer selects "account profile" from main menu 418 by entering "4", then the customer is directed to the account profile menu 800. Preferably, account profile menu 800 includes several different options. Some options available on account profile menu 800 preferably include (1) the ability to change the customer's password or pass code, (2) the ability to change the spoken language of the voice prompts; and (3) the ability to vary the prompt level. Systems can include anywhere from none, one, several or all of these options. In addition, systems can also include additional options that vary account preferences or account profile characteristics.

Figure 8A:
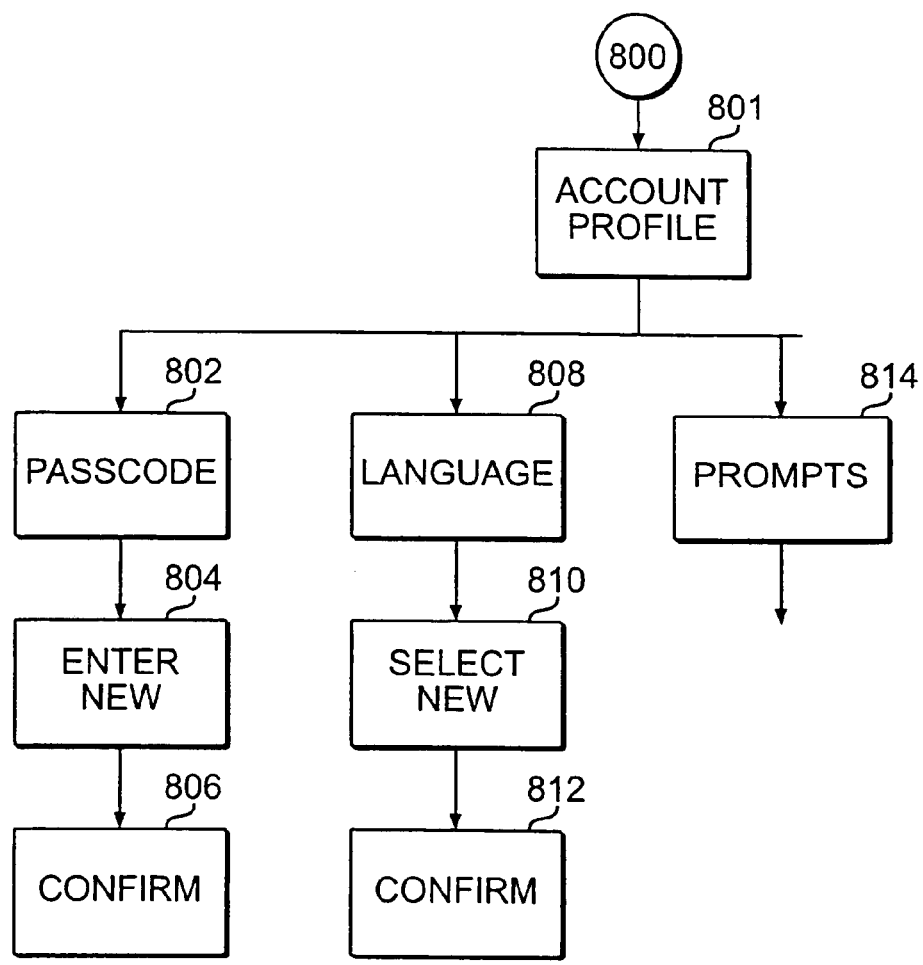
FIGS. 8A-8C are schematic diagrams showing the preferred embodiment of the account profile menu, including submenus, used in the present invention.
Figure 8B:
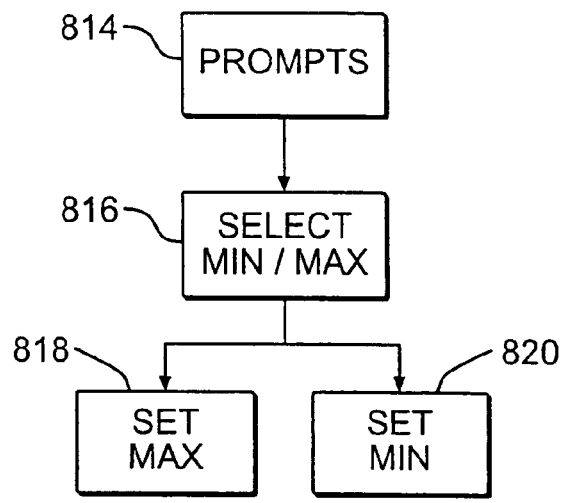
Figure 8C:
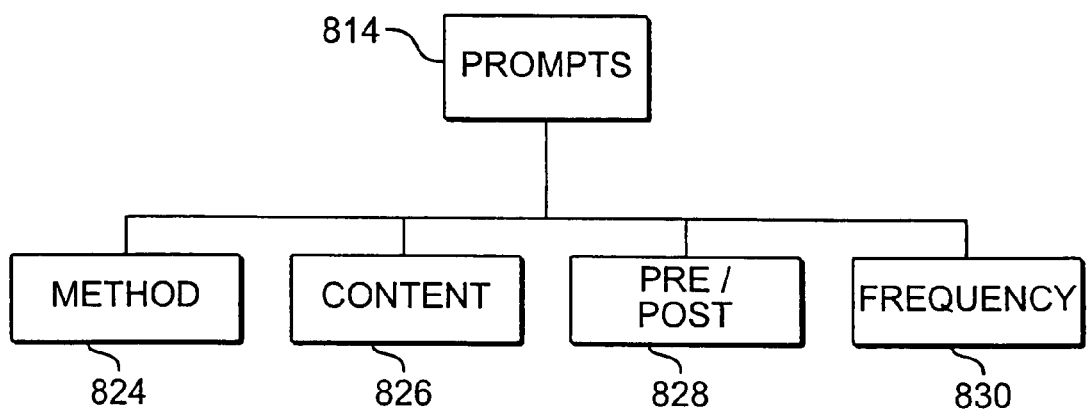

The preferred embodiment of the account profile menu is shown schematically in FIG. 8. After the customer has entered "4" in the main menu, the customer is directed to the account profile menu 800. Preferably, after the customer is directed to the account profile menu 800, the system recites the account profile menu 800 options. In one embodiment of the present invention, the system recites, "To change password (or pass code), press 1; to change language preference, press 2; to select prompt level, press 3; and to deactivate your account, press 5." After hearing the menu options, the customer enters a selection.

If the customer wants to change the password or the pass code, the customer would select the first option 802, preferably by entering the number 1. After the selection has been received by the system, the system then moves on to the next stop 804, where the system asks the customer to enter a new password or pass code.

After the new password or pass code has been received by the system, the system moves on to the third step 806 where the system replays the data entered by the customer. After the data has been replayed, the system asks the customer if the replayed data is correct. Preferably, the system confirms the new password or pass code by asking the customer to enter a response, for example, pressing the number "1", if the replayed data corresponds with the new password or pass code. If the customer responds with a "1", for example, then the system knows that the new password or pass code is correct. The system associates that password or pass code with the customer. If a different response is received or if no response is received, the system can inform the customer that the new password or pass code has not been accepted. The system can then either return to the first step 802 of the change password or pass code menu, return to the main menu, or exit out of the system.

If the customer wants to change the spoken language used by the system for their prompts, then the customer would select the change language preference menu 808. Preferably, the customer indicates this section by entering a "2". Once the customer has selected the change language preference menu 808, the system then offers a variety of language choices to the customer.

Any suitable number of language choices can be offered. Preferably, the language choices offered reflect the languages that are used by customers. In an exemplary embodiment, two language choices, English and Spanish, are offered. Other language choices could also be offered. Preferably, the system recites the various language choices in the second step 810 of the change language selection 808. Preferably, the language choices are recited in the language offered and the language choices preferably correspond to a number.

After the language choices have been offered, the system gives the customer the opportunity to enter a selection. Once the system has received the selection, the system progresses to the third step 812 of the change language selection. In this third step 812, the system confirms the language selection. Preferably, the system asks the customer to confirm the language selection by entering a number. If the system receives the appropriate number, the system associates the language selection with the customer, and future interaction with the customer via prompts is conducted in the selected language. If the system receives the incorrect confirmation number or receives no confirmation number, there are several things the system can do. The system can ask the customer to re-enter the confirmation number, the system can inform the customer that the selected language has not been confirmed and therefore, the previously used language will be used, the system can return to the change language menu 808, or the system can exit the system. The system can also do a combination of these steps.

Another option available to customers is the ability to vary the prompt level. Prompt level generally refers to the frequency and content of the messages provided by the system to the customer. By selecting this option, customers can vary how often and what kind of announcements they receive. Preferably customers can select this option by entering the number "4" from the account profile menu 801. After customers select this option, customers are directed to the adjust prompt menu 814. There are several different embodiments of adjust prompts menus 814 in accordance with the present invention.

In one embodiment, the system offers two choices in the select prompts step 816. Preferably, these steps are associated with a number, for example, "1" and "2", so the system asks the customer to select "1" for maximum prompts and "2" for minimum prompts. If the customer selects "1" for maximum prompts, the system associates the maximum prompt selection with the customer in step 818. Similarly, if the customer selects "2" for minimum prompts, the system associates the minimum prompt selection with the customer in step 820.

In the context of this embodiment, maximum announcements refers to the option where customers hear a series of announcements every time they make a call. The service provider can vary the content of those announcements. For example, one possible announcement would include the current account balance, the time and date of the last incoming or outgoing call, the duration of the call, and the cost of the call. Of course, different types of messages related to the customer's account or calling activity can be included in the announcement. Also, the announcement mentioned above could be shortened and different aspects of the announcement could be removed.

Regardless of which announcement is provided to the customer, the maximum prompts option plays the announcement every time the customer originates a call (outgoing call, the customer uses the wireless telephone to call another party) and provides an opportunity for the customer to hear the announcement every time the customer receives an incoming call (the customer receives a call on the wireless phone from a calling party).

If the customer opts for minimum prompts, the customer receives the announcement whenever their account balance falls below a predetermined level. The level can be set either in monetary units or in time units. For example, if the predetermined level is set at $10.00, then the system plays the announcement to the customer when the customer's account balance falls below $10.00. Another predetermined level could be zero minutes or zero dollars. This predetermined level can be set to any level desired by the service provider.

Another approach is to have a predetermined level based on the number of minutes available in the account. With taxes, tariffs, long distance charges, roaming charges, landline access fees and other charges that affect the cost of the call, it is difficult to determine, with exact certainty, how many minutes are available to a customer. So the system estimates the amount of time available in a customer's account. Any suitable method of estimating the time remaining may be used. One example of estimating the remaining time is to compute the average cost per unit time historically, and use that rate, along with the remaining account balance, to estimate the remaining time.

In another embodiment, additional flexibility is offered to the customer to specifically tailor the various announcement parameters. A sub-menu 822 provides announcement options to customers. When customers enter this sub-menu 822, the system informs them of their choices. Some options available to customers include (1) the method of delivery 824; (2) the content 826; (3) pre or post call 828; and (4) frequency 830. Customers preferably indicate a selection by pressing the corresponding number on their keypads.

By selecting "1", the customer can choose the way in which the announcement is delivered to them. The announcement can be delivered as a voice message, as disclosed above, or the announcement can be sent as a text message that is displayed on their wireless telephones. Preferably, SMS (Short Messaging Services) protocol in accordance with wireless telecommunications standards organizations such as TIA/EIA-41 or ETSI, is used to send the text messages.

Customers can modify the content of the announcement by selecting "2". This places the customer in sub-menu 826. The system offers many different possible messages including current account balance, the time and date of the last incoming or outgoing call, the duration of the call, the cost of the call, and information related to the last replenishment. Other types of messages related to the customer's account or calling activity can also be included in the announcement. When customers enter sub-menu 826, they have the ability, by navigating through the sub-menu, to pick and choose which messages they want included in their announcement.

By selecting "3", customers enter a sub-menu 828, where they can select either pre or post call announcements. A pre-call announcement is an announcement that is played when the customer originates an outgoing call. Before the call is connected (that is, before the called party is connected to the call) the announcement is played to the customer. A post-call announcement is an announcement that is played after a call has ended. In order for a customer to hear a post-call announcement, the customer stays on the line after the other party has hung up. This signals the system that the customer is waiting for a post-call announcement. After the system has sensed that the customer is still on the line after the other party has hung up, the system plays a post-call announcement. In sub-menu 828, customers can elect to receive either pre or post-call announcements. Customers can also elect to receive both pre and post-call announcements.

The fourth option is the frequency option. Customers enter sub-menu 830 by pressing "4". In sub-menu 830, customers can select the frequency of their announcements. In other words, customers can tell the system how often they would like to receive the announcement.

Some frequency options include a set period. For example, one option could be that the announcement is played every time a call is made or received. Another period could be that the announcement is played every several calls, for example, every $5^{th}$ call or every $10^{th}$ call.

Another period could be time. The customer could set the period to be every 10 minutes of usage or every 30 minutes of usage. With these time related periods, the system would play the announcement during the next available pre or post-call opportunity after the customer has used the telephone for the pre-selected period of time. In the examples given above, the system would wait for the customer to use the telephone for the pre-selected period of time, and then after that period of time has been exceeded, the system would play the announcement at the next available opportunity. By waiting for the next available opportunity, the system does not play the announcement during a call or while another party is on the line. The announcement may contain personal and confidential information and is intended solely for the customer. By waiting for an available opportunity, the system endeavors to protect the confidential information of the customer.

Available funds is another frequency option. Like the time option, customers could select a certain dollar amount as their period. One example is $10.00. So, the system would play the announcement every time the customer's account was reduced by $10.00. Similar to the time period option, the system waits for an appropriate opportunity to play the announcement.

Another option is a threshold option. Using this option, the customer does not receive any announcements until the account balance falls below a pre-selected level. For example, if the level were set at $10.00, the customer would hear no announcements until the customer's account balance fell below $10.00. Then, after the account balance fell below that level, the system would play the announcement at every call.

Figure 9:
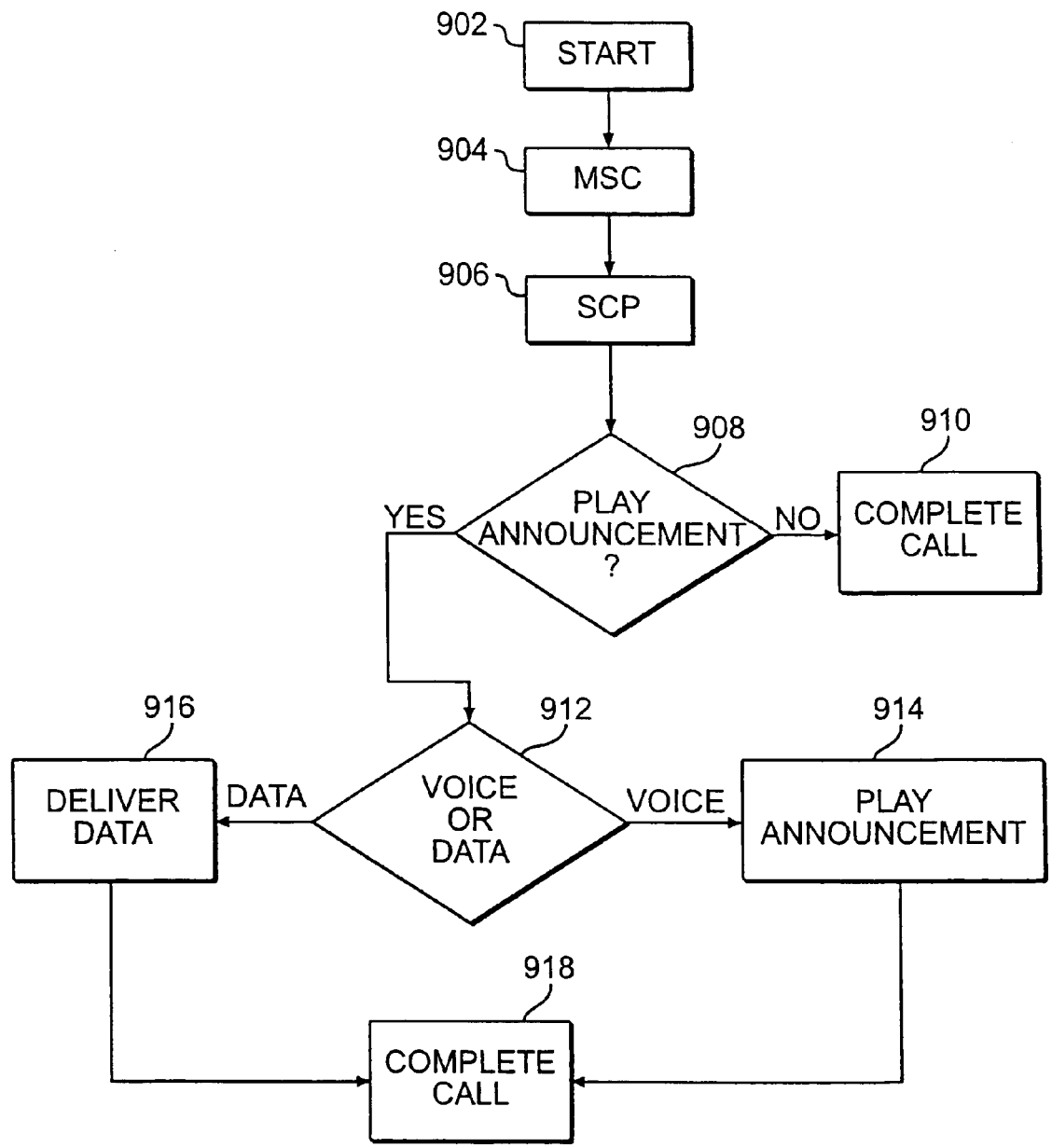
FIG. 9 is a flow diagram that illustrates a preferred embodiment of the announcement feature of the present invention.

FIG. 9 is a flow diagram that illustrates a preferred embodiment of the announcement feature. The items referred to in FIG. 9 are shown schematically in FIG. 2. The process starts 902 in one of two ways. For pre-call announcements, the process starts when the customer originates an outgoing call by sending dialed digits from a wireless phone. For post-call announcements, the process begins when the system senses that a pre-paid wireless customer did not hang up after the other party has hung up. In other words, the customer stays on the line after the other party hangs up. If either of these two conditions is met, the process begins.

In step 904, Mobile switching system 202 receives both the telephone number of the customer along with the dialed digits. Mobile switching system 202 communicates with SCP 204 and notifies SCP 204 that a mobile number associated with a customer has originated a call that includes dialed digits.

In step 906, a pre-paid application 216 on SCP 204 uses the mobile number to retrieve account information associated with that mobile number. This account information preferably includes features and services purchased by the customer, account balance information, and announcement preferences.

Once the account information has been retrieved, SCP 204 determines, in step 908, if an announcement should be made. If SCP 204 determines that no announcement is necessary, SCP 204 directs mobile switch 202 to complete the call.

If SCP 204 determines that an announcement is necessary, SCP 204 will then determine the method by which the announcement should be sent to the customer in step 912. In step 912, SCP 204 determines if a voice message should be sent or a text message should be sent. If a voice message is to be sent, SCP 204 retrieves the announcement content preferences and instructs IP 206 to play an announcement containing the content selected by the customer. This is accomplished in step 914. After the announcement has ended, SCP 204 instructs mobile switch 202 to complete the call in step 918. If the customer has selected a text message, SCP 204 retrieves the announcement content preferences and delivers a text message containing the content selected by the customer by known methods. Preferably, SMS is used to deliver the text message to the customer's wireless telephone. The text message is delivered in step 916. After the text message has been sent, or while the text message is being sent, SCP 204 instructs mobile switching system 202 to complete the call in step 918.

Post-call announcements progress in a similar fashion. However, the progression of post-call announcements include the following differences. As described above, post-call announcements are started in step 902 by mobile switching system 202 detecting the condition that a pre-paid wireless customer did not hang up after the other party hung up.

Another difference between pre and post-call announcements is the progression of the call at step 912. For post-call announcements that are sent by an SMS text message, SCP 204 can terminate the call at step 912, after SCP 204 has determined that a SMS text message has been requested instead of a voice message. There is no need to maintain a voice channel to transmit text to the customer's wireless telephone, so to conserve system resources, mobile switching system 202 is preferably instructed to terminate the voice channel as soon as SCP 204 has determined that a text message instead of a voice message is to be delivered.

(5) Promotions 505

Selecting "5" allows customers to listen to promotions offered by the wireless telephone service provider. Preferably, the system includes provisions that permit the service provider to change and alter the promotion information throughout the year. The system also preferably permits multiple promotions that are accessible to customers through a sub-menu under promotions 505.

As described above, exemplary embodiments can be in the form of computer-implemented processes and apparatuses for practicing those processes. Exemplary embodiments can also be in the form of computer program code containing instructions embodied in tangible media computer program product, such as floppy diskettes, CD ROMs, hard drives, or any other computer-readable storage medium, wherein, when the computer program code is loaded into and executed by a computer, the computer becomes an apparatus for practicing the exemplary embodiments. Exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

We claim:

1. A method of providing communication between a wireless device and an interactive voice response system for pre-paid wireless services, the method comprising:

connecting the interactive voice response system with the wireless device when an interactive voice response (IVR) service for a customer is requested;

receiving customer information from the wireless device at the interactive voice response system, the customer information including a number to identify the wireless device and an account associated with the wireless device, the customer information including a passcode associated with the number;

utilizing a communication path from the interactive voice response system to the wireless device and transmitting to the customer at least one of a rate plan that is the current rate plan and features of the customer, the rate plan and features corresponding to the rate plan and features for calls made using the wireless device.

2. The method according to claim 1, further comprising transmitting to the customer a name of the rate plan, features, and at least one fee charged by the rate plan.

3. The method according to claim 1, further comprising transmitting to the customer a name of the rate plan, and the price of a monthly access fee charged by the rate plan.

4. The method according to claim 1, further comprising transmitting to the customer a name of the rate plan, the price of a monthly access fee charged by the rate plan, and at least one fee charged by the rate plan, other than the monthly access fee.

5. The method according to claim 1, wherein at least a portion of the communications between the interactive voice response system and the wireless device is performed using intelligent network transactional capabilities application part (IN TCAP) messaging.

6. The method according to claim 5, wherein at least a portion of the communications between the interactive voice response system and the wireless device is performed using at least one of transmission control protocol/internet protocol (TCP/IP) and IN TCAP messaging.

7. The method according to claim 1, wherein:
at least a portion of the communications between the interactive voice response system and the wireless device is performed using a short messaging service sending a text message including the rate plan and features corresponding to the rate plan and features for calls made using the wireless device.

8. The method of claim 1 wherein:
the interactive voice response system is implemented by an interactive voice response application on a service control point.

9. The method of claim 8 wherein:
the interactive voice response application determines if the customer is a subscriber to the interactive voice response system in response to the customer information.

10. The method of claim 8 wherein:
the interactive voice response system interacts with the customer through a mobile switching center.

11. A computer program product for providing communication between a wireless device and an interactive voice response system for pre-paid wireless services, the computer program product including instructions on a computer readable medium for implementing a method, comprising:
connecting the interactive voice response system with the wireless device when an interactive voice response (IVR) service for a customer is requested;
receiving customer information from the wireless device to the interactive voice response system, the customer information including a number to identify the wireless device and an account associated with the wireless device, the customer information including a passcode associated with the number;
utilizing a communication path from the interactive voice response system to the wireless device and transmitting to the customer at least one of a rate plan that is the current rate plan and features of the customer, the rate plan and features corresponding to the rate plan and features for calls made using the wireless device.

12. The computer program product according to claim 11, further comprising instructions for implementing transmitting to the customer a name of the rate plan, features, and at least one fee charged by the rate plan.

13. The computer program product according to claim 11, further comprising instructions for implementing transmitting to the customer a name of the rate plan, and the price of a monthly access fee charged by the rate plan.

14. The computer program product according to claim 11, further comprising instructions for implementing transmitting to the customer a name of the rate plan, the price of a monthly access fee charged by the rate plan, and at least one fee charged by the rate plan, other than the monthly access fee.

15. The computer program product according to claim 11, wherein at least a portion of the communications between the interactive voice response system and the wireless device is performed using intelligent network transactional capabilities application part (IN TCAP) messaging.

16. The computer program product according to claim 15, wherein at least a portion of the communications between the interactive voice response system and the wireless device is performed using at least one of transmission control protocol/internet protocol (TCP/IP) and IN TCAP messaging.

17. The computer program product according to claim 11 wherein:
at least a portion of the communications between the interactive voice response system and the wireless device is performed using a short messaging service sending a text message including the rate plan and features corresponding to the rate plan and features for calls made using the wireless device.

18. The computer program product of claim 11 wherein:
the interactive voice response system is implemented by an IVR application on a service control point (SCP).

19. The computer program product of claim 18 wherein:
the interactive voice response application determines if the customer is a subscriber to the interactive voice response system in response to the customer information.

20. The computer program product of claim 18 wherein:
the interactive voice response system interacts with the customer through a mobile switching center.

* * * * *